(12) United States Patent
Ishiyama

(10) Patent No.: US 7,736,768 B2
(45) Date of Patent: Jun. 15, 2010

(54) MAGNETIC DISK AND MANUFACTURING METHOD THEREOF

(75) Inventor: Masafumi Ishiyama, Singapore (SG)

(73) Assignees: Hoya Corporation, Tokyo (JP); Hoya Magnetics Singapore Pte. Ltd., Singapore (SG)

( * ) Notice: Subject to any disclaimer, the term of this patent is extended or adjusted under 35 U.S.C. 154(b) by 693 days.

(21) Appl. No.: 11/238,011

(22) Filed: Sep. 29, 2005

(65) Prior Publication Data

US 2006/0073362 A1    Apr. 6, 2006

(30) Foreign Application Priority Data

Sep. 29, 2004   (JP)   ............... 2004-283137

(51) Int. Cl.
  *G11B 5/72*   (2006.01)
  *G11B 5/82*   (2006.01)
  *G11B 5/84*   (2006.01)

(52) U.S. Cl. .................................... 428/834

(58) Field of Classification Search ............. 428/834, 428/848.1, 848.6
See application file for complete search history.

(56) References Cited

U.S. PATENT DOCUMENTS

| | | | | |
|---|---|---|---|---|
| 4,162,350 A | * | 7/1979 | Yanagisawa et al. | 428/633 |
| 5,249,093 A | * | 9/1993 | Umekida et al. | 360/135 |
| 5,324,593 A | * | 6/1994 | Lal et al. | 428/610 |
| 5,520,981 A | * | 5/1996 | Yang et al. | 428/848.1 |
| 5,776,577 A | * | 7/1998 | Yanagisawa | 428/848.6 |
| 5,837,357 A | * | 11/1998 | Matsuo et al. | 428/212 |
| 6,096,405 A | * | 8/2000 | Takahashi et al. | 428/141 |
| 6,639,763 B1 | * | 10/2003 | Araki et al. | 360/324 |
| 6,680,112 B1 | * | 1/2004 | Suzuki et al. | 428/833.4 |
| 6,805,900 B2 | * | 10/2004 | Lewis | 427/96.1 |
| 7,166,319 B2 | * | 1/2007 | Ishiyama | 427/127 |
| 7,208,236 B2 | * | 4/2007 | Morikawa et al. | 428/815.1 |
| 2005/0249983 A1 | * | 11/2005 | Stirniman et al. | 428/834 |
| 2006/0172153 A1 | * | 8/2006 | Kikitsu et al. | 428/826 |
| 2007/0230055 A1 | * | 10/2007 | Shirotori et al. | 360/135 |

FOREIGN PATENT DOCUMENTS

JP   3058066 B2   4/2000

* cited by examiner

*Primary Examiner*—Mark Ruthkosky
*Assistant Examiner*—Sathavaram I Reddy
(74) *Attorney, Agent, or Firm*—Sughrue Mion, PLLC

(57) ABSTRACT

A magnetic disk comprises a magnetic layer and a protective layer sequentially formed on a disk-shaped substrate and has a principal surface to which data is recorded, and a side surface portion both of which are coated with the protective layer. The protective layer on the side surface portion is thinner than the protective layer on the principal surface. Preferably, the side surface portion includes a side wall surface, and a chamfered surface lying between the side wall surface and the principal surface, and at least the protective layer on the chamfered surface is thinner than the protective layer on the principal surface.

4 Claims, 3 Drawing Sheets

MAGNETIC DISK AND MANUFACTURING METHOD THEREOF

This application claims priority to prior Japanese patent application JP 2004-283137, the disclosure of which is incorporated herein by reference.

BACKGROUND OF THE INVENTION

The present invention relates to a magnetic disk to be mounted on a magnetic disk device, such as a hard disk drive (HDD) and the like, for recording information, and the manufacturing method thereof.

Conventionally, with a magnetic disk device, at a halt stage, a CSS (Contact Start and Stop) method has been employed wherein a magnetic head is kept in contact with an inner circumferential region surface for contact sliding on the magnetic disk. At a start-up stage, the magnetic head is slightly raised while sliding in contact with this inner circumferential region surface to start recording/reproduction at a region for recording/reproduction outside of the inner circumferential region surface for contact sliding. With this CSS method, the region for contact sliding needs to be secured on the magnetic disk separate from the region for recording/reproduction.

Also, with the CSS method, a protruding/recessed shape having certain amount of surface roughness, which is called texture, has been provided on the magnetic disk principal surface to avoid a state wherein the magnetic disk and the magnetic head are subjected to contact adsorption at the halt stage. Further, with the CSS method, countermeasures have been devised such as coating the magnetic disk surface with a protective layer to protect the magnetic disk from contact sliding of the magnetic head (e.g., Japanese Patent No. 3058066).

On the other hand, recently, an LUL (Load/Unload) method, which can realize high recording capacity, has been employed. With the LUL method, at the halt stage, the magnetic head is evacuated to a tilting table called a ramp positioned outside of the magnetic disk. At the start-up stage, the magnetic head is loaded to a load zone on the magnetic disk surface from the ramp following the magnetic disk starting rotations, following which recording/reproduction is performed. Accordingly, the magnetic head is not subjected to contact sliding on the magnetic disk.

With this LUL method, the region for contact sliding of the magnetic head needs not to be provided on the magnetic disk surface unlike with the CSS method, the area of the region for recording/reproduction can be widely secured as compared with the CSS method, thereby providing an advantage wherein the recording capacity of the magnetic disk can be increased.

Also, with the LUL method, the magnetic disk is not in contact with the magnetic head, so that texture needs not to be provided, unlike with the CSS method, and the magnetic disk surface can be further subjected to smoothing. Accordingly, the LUL method also provides an advantage wherein the recording density of the magnetic disk can be improved by reducing flying amount of the magnetic head (e.g., 10 nm or less) lower than the case of the CSS method.

Incidentally, even with the magnetic disk to be mounted to a magnetic disk device employing the LUL method, a protective layer is provided to protect a magnetic layer formed on the disk substrate from corrosion and abrasion. The film thickness of this protective layer is preferably thick from the perspective of abrasion resistance, but spacing losses need to be reduced to achieve high recording density in recent years, and accordingly, reduction has been required for the film thickness of the protective layer as well.

The protective layer is formed on the magnetic layer normally using the sputtering method or the plasma CVD method, and the principal surface of the magnetic disk, i.e., the principal surface on which data is recorded, and the side surface portion are coated with the protective layer respectively. In this case, with the principal surface and the side surface portion of the magnetic disk, the protective layer is formed with generally the same film thickness. However, according to the studies of the present inventor, the present inventor found that with the side surface portion of the magnetic disk, the surface roughness is rougher than the principal surface highly subjected to accurate mirror surface formation in many cases, so even with the same film thickness of the protective layer as the principal surface, the adherability of the protective layer readily deteriorates. Accordingly, with the protective layer formed on the side surface portion of the magnetic disk, particles tend to occur due to contact, friction, and so forth with other members. The occurred particles may protrude as protrusions or cause contamination of the magnetic head, by adhering to the surface of the magnetic disk, for example.

Also, high smoothness of the magnetic disk surface is necessary in order for reducing flying height (flying amount) necessary for realizing high recording density of the magnetic disk. Due to further decrease of the flying amount of the recording head according to introduction of the recent LUL method, even with extremely low flying amount of 10 nm or less, for example, stable actions of the magnetic disk have been required. However, upon the magnetic head being subjected to flying flight on the magnetic disk surface with such an extremely low flying amount, there has been a problem in that fly-stiction frequently occurred. Fly-stiction is an obstacle wherein the flying attitude of the magnetic head suddenly becomes unstable during recording/reproduction, causing abnormal fluctuation in recorded signals and reproduced signals. This fly-stiction especially readily occurs with the magnetic head which performs flying with an NPAB (negative pressure air bearing surface) slider, i.e., a negative pressure slider. The magnetic head including a negative pressure slider has an advantage wherein stable flying flight can be performed even at a low flying amount of 10 nm or less, but this causes strong negative pressure upon the magnetic head undersurface (i.e., surface facing the magnetic disk). Accordingly, this readily causes fly-stiction.

Incidentally, with the LUL method, the flying amount of the magnetic head is greatly narrowed as compared with the conventional one, so that a serious problem readily occurs even with a surface defect (e.g., protruding defect) which has not been seen as a problem at all conventionally existing on the surface of the magnetic disk to be mounted on an HDD, for example. In particular, with a small-diameter magnetic disk to be mounted on a small HDD, the above problem becomes more serious. This is because occurrence of trouble is particularly concerning since such a small-diameter magnetic disk having an outer diameter of 30 mm or less, for example, is mounted in a mobile HDD such as a cellular phone, digital camera, and so forth, and is used under various harsh environments wherein impulsive force such as falling, collision, vibration, or the like exists consistently. Accordingly, improvement of the durable reliability of the magnetic disk has been further required.

SUMMARY OF THE INVENTION

In the light of these situations, the present inventor has attempted to develop a magnetic disk which can perform safely recording/reproduction without causing crashing, fly-stiction, and so forth, even when flying flight is performed with a flying amount of 10 nm or less of the magnetic head.

That is, the present invention has been made to solve such problems, and to provide a magnetic disk which can perform safely recording/reproduction even when flying flight is performed with a flying amount of 10 nm or less of the magnetic head, and the manufacturing method thereof.

Also, the present invention is to provide a magnetic disk which is suitable as a magnetic disk to be mounted on a hard disk drive for performing start-up/halt operations using the load/unload method, and the manufacturing method thereof.

The present inventor has performed various studies to solve the above problems. Upon observing the principal surface of the magnetic disk wherein the above fly-stiction occurred using an atomic force microscope, and an electron microscope in detail, the present inventor has found that a protruding foreign object or material adheres to the principal surface of the magnetic disk. The present inventor is convinced that the protruding foreign objects are responsible for the above problems. This is because the flying amount of the magnetic head further decreases as compared with the conventional flying amount, and accordingly, protruding portions which have not been seen as problematic conventionally since no trouble was caused thereby, adversely affect the magnetic head. Also, as a result of analyzing this protruding foreign object, the present inventor has found that this has the same components as the material of the protective layer.

Consequently, when performing studies focusing on the protective layer, the present inventor has found out that with the protective layer formed on the side surface portion of the magnetic disk, particles readily occur as described above, and causal relationship exists between occurrence of the particles and the film thickness of the protective layer of the magnetic disk. In particular, with an environment wherein the above mobile HDD is used, occurrence of particles is readily accelerated, which is inferred.

As a result of devoted studies based on the above-clarified facts and knowledge, the present inventor has completed the present invention.

The present invention is applied to a magnetic disk comprising a magnetic layer and a protective layer sequentially formed on a disk-shaped substrate.

According to a first aspect of the present invention, the magnetic disk has a principal surface to which data is recorded, and a side surface portion both of which are coated with the protective layer. The protective layer on the side surface portion is a film thinner than the protective layer on the principal surface.

In a second aspect of the present invention, it is preferable that the side surface portion includes a side wall surface, and a chamfered surface lying between the side wall surface and the principal surface, and that at least the protective layer on the chamfered surface is a film thinner than the protective layer on the principal surface.

In a third aspect of the present invention, it may further comprises a region serving as a data zone for recording data, and a region serving as a load zone lying between the principal surface and the side surface portion for loading a magnetic head on the magnetic disk. In this case, the protective layer formed on the region serving as the load zone is a film thicker than the protective layer formed on the region serving as the data zone.

In a fourth aspect of the present invention, it is preferable that the film thickness of the protective layer consecutively becomes thinner from the principal surface toward the side surface portion. Alternatively, the film thickness of the protective layer may consecutively become thinner from the region serving as the data zone toward the region serving as the load zone.

In a fifth aspect of the present invention, it is preferable that the protective layer is an amorphous carbonaceous protective layer.

According to a seventh aspect of the present invention, a method for manufacturing the magnetic disk is provided. The method can be applied to the magnetic disk according to the above-mentioned first through fifth aspects and comprises a protective layer forming process, following the magnetic layer being formed on the disk-shaped substrate, for applying bias voltage to the substrate with the magnetic layer to bring plasma including the material of the protective layer into contact with the magnetic layer, and thereby depositing the protective layer on the magnetic layer. In the protective layer forming process, a plasma shielding member, of which the thickness is thicker than the thickness of the magnetic disk, having a circular opening portion, of which the radius is smaller than the diameter of the magnetic disk, is employed. The substrate with the magnetic layer is disposed in the center of the opening portion of the plasma shielding member, and the protective layer is formed.

It is preferable that the protective layer is formed with the plasma CVD method.

BRIEF DESCRIPTION OF THE DRAWINGS

FIG. 3A is a plane view, and FIG. 3B is a cross-sectional view.

DESCRIPTION OF THE PREFERRED EMBODIMENT

Description will be made below regarding an embodiment of the present invention.

A magnetic disk according to the present invention comprises at least a magnetic layer and a protective layer formed in order on a disk-shaped substrate. Here, the protective layer is provided for protecting the magnetic layer from corrosion and abrasion. With the magnetic disk according to the present invention, a principal surface on which data is recorded and a side surface portion with the substrate are coated with the protective layer, and the protective layer of the side surface portion is a film thinner than the protective layer on the principal surface.

Generally, the protective layer is formed on the magnetic layer using the sputtering method or the plasma CVD method, and thus, the principal surface and the side surface portion of the magnetic disk are coated with the protective layer respectively, and with the principal surface and the side surface portion of the magnetic disk, the protective layer is formed with generally the same film thickness.

According to the studies of the present inventor, with the side surface portion of the magnetic disk, the surface roughness is rougher than the principal surface highly subjected to accurate mirror surface formation in many cases, the adherability of the protective layer readily deteriorates. Accordingly, with the protective layer formed on the side surface portion of the magnetic disk, particles tend to occur due to contact, friction, and so forth, with other members. Conventionally, the film thickness of the protective layer on the principal surface of the magnetic disk has been set from the perspective of reduction in spacing losses, but conventionally, a problem wherein particles readily occur possessed by the protective layer of the side surface portion of the magnetic disk has not been confirmed. Similarly, no attention has been paid to the film thickness of the protective layer formed on the side surface portion from the perspective of occurrence of particles.

In the magnetic disk according to the present invention, the protective layer of the side surface portion is a film thinner than the protective layer on the principal surface, thereby markedly preventing occurrence of particles. Thus, protruding foreign objects can be prevented from formation by particles adhering to the principal surface of the magnetic disk. Also, particles can be prevented from being a factor in contamination of the magnetic head.

The film thickness of the protective layer preferably consecutively becomes thinner from the principal surface toward the side surface portion. This is because particles readily occur by contact with other member or the like, in the event that the film thickness of the protective layer includes a non-consecutive portion such as a step.

Figure 2:
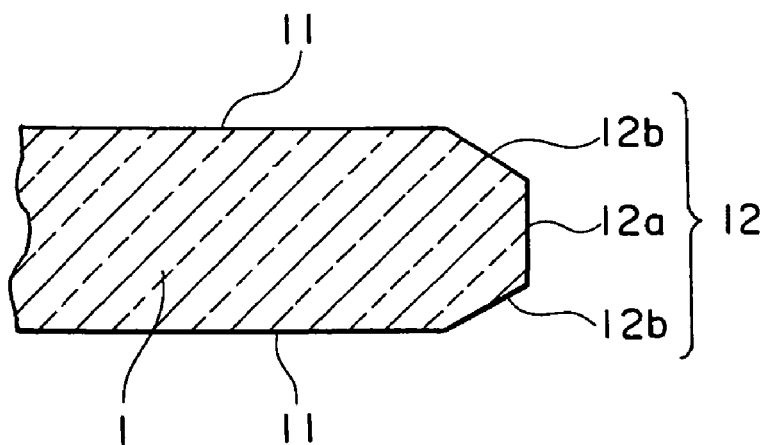
FIG. 2 is a cross-sectional view of a disk-shaped substrate.

In the magnetic disk according to the present invention, the side surface portion of the substrate includes a side wall surface, and a chamfered surface lying between the side wall surface and the principal surface, and at least the protective layer on the chamfered surface is preferably thinner a film than the protective layer on the principal surface. That is, as shown in FIG. 2, a disk-shaped substrate 1 comprises upper and lower principal surfaces 11 and 11, and a side surface portion 12 formed between the two principal surfaces, and the side surface portion 12 comprises a side wall surface 12a, and two chamfered surfaces 12b and 12b lying between the side wall surface 12a and the principal surfaces 11 and 11. Accordingly, at least the protective layer on the chamfered surface 12b is preferably thinner a film than the protective layer on the principal surface 11. The protective layer on the chamfered surface tends to decrease in adherability, which is because in particular thick film thickness readily becomes a trigger for occurrence of particles. The film thickness of the protective layer on the sidewall surface is preferably thinner a film than the protective layer on the principal surface as well.

In the magnetic disk according to the present invention, the film thickness of the protective layer on the principal surface is preferably 4 nm or more to obtain preferable protective performance, but the upper limit thereof is preferably 8 nm or less from the perspective that the film thickness of the protective layer needs to be reduced as lower as possible to suppress spacing losses in connection with improvement of the recording density of the magnetic disk. The film thickness of the protective layer on the side surface portion should be thinner a film than the film thickness of the protective layer on the principal surface, preferably less than 4 nm, more preferably 3 nm or less. In the event of excessively thin film thickness, corrosion is sometimes caused upon the magnetic head by migration of metal ion making up the magnetic layer from the disk side surface toward the principal surface, so that from the perspective of preventing this case, the lower limit is preferably 0.5 nm or more.

Figure 4:
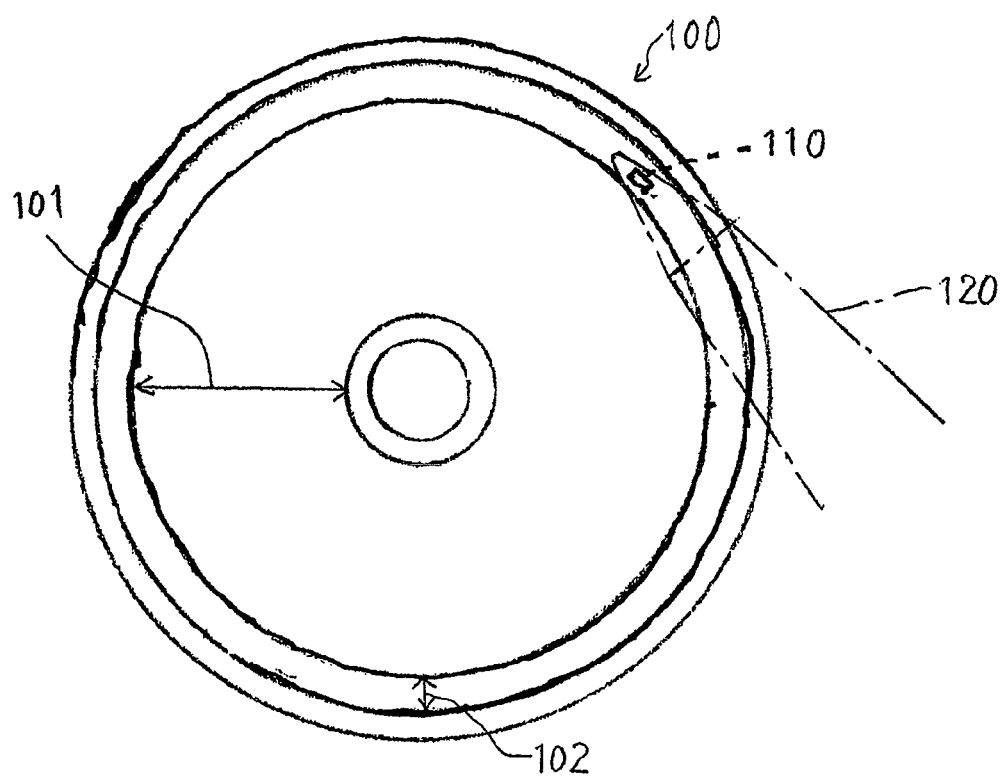
FIG. 4 illustrates a schematic configuration of a magnetic disk with plural regions and a juxtaposed magnetic head held with an arm.

Another embodiment of the magnetic disk according to the present invention is a magnetic disk 100 comprising a region serving as a data zone 101 for recording data, and a region serving as a load zone 102 lying between the principal surface and the side surface portion for loading a magnetic head 110 held with an arm 120 on the magnetic disk, as shown in FIG. 4. In this case, the protective layer formed on the region serving as the load zone is preferably a thicker film than the protective layer formed on the region serving as the data zone. In general, the load zone is provided closer to the outer circumferential side than the data zone, and the region other than the data zone of the outmost circumferential portion of the disk is used as a load zone. With the magnetic disk according to the present invention, the protective layer formed on the region serving as the load zone is a thicker film than the protective layer formed on the region serving as the data zone, and thus, durability as to the impulsive force of the magnetic head at the time of loading or unloading the magnetic head to/from the magnetic disk can be improved. The film thickness of the protective layer formed on the region serving as the load zone is preferably thicker than the protective layer formed on the region serving as the data zone, for example, by 5% or more.

In this case, the film thickness of the protective layer preferably consecutively becomes thinner from the region serving as the data zone toward the region serving as the load zone. In the event that a step is formed by the film thickness of the protective layer differing at the boundary between the region serving as the data zone and the region serving as the load zone, impact is great when the magnetic head comes into collision with the protective layer of the load zone, and flight of the magnetic head may becomes unstable.

In the present invention, the protective layer is preferably a carbonaceous protective layer. A carbonaceous protective layer generally has a hard film, excels in abrasion resistance, and has appropriate sliding properties. In particular, a carbonaceous protective layer including hydrogen comprises a stable amorphous structure with high stiffness, so the protective layer exhibits high abrasion resistance in its entirety.

Also, with the present invention, in particular, a carbonaceous protective layer including nitrogen is preferably employed as the surface portion of the protective layer. The film of this layer is flexible, and can improve the crashproof of the protective layer. Accordingly, a carbon-hydrogen protective layer is employed for the portion where the protective layer abuts on the magnetic layer, and a carbon-nitrogen protective layer or carbon-hydrogen-nitrogen protective layer is employed for the surface portion of the protective layer, which is preferable for the present invention.

In the present invention, a carbonaceous protective layer is preferably a diamond-like-carbon protective layer of which the principal component is carbon. A carbon-nitrogen protective layer and a carbon-hydrogen protective layer are preferably a diamond-like-carbon protective layer of which the principal component is carbon as well.

The magnetic disk according to the present invention can be obtained by a manufacturing method of a magnetic disk including a protective layer forming process for forming the magnetic layer on the disk-shaped substrate, following which applying a bias voltage to this substrate with the magnetic layer, and bringing plasma including the material of the protective layer into contact with the substrate to deposit the protective layer on the magnetic layer. The film thickness of the protective layer differs between the principal surface and the side surface portion, but the protective layer is preferably formed such that the film thickness consecutively changes, so with the protective layer forming process, the protective layer is preferably formed by disposing the substrate with the magnetic layer at the center of the circular opening portion of a plasma shielding member. In this case, the thickness of the shielding member is preferably thicker than the substrate thickness of the magnetic disk, and also the radius of the opening portion is smaller than the diameter of the magnetic disk.

Figure 3A:
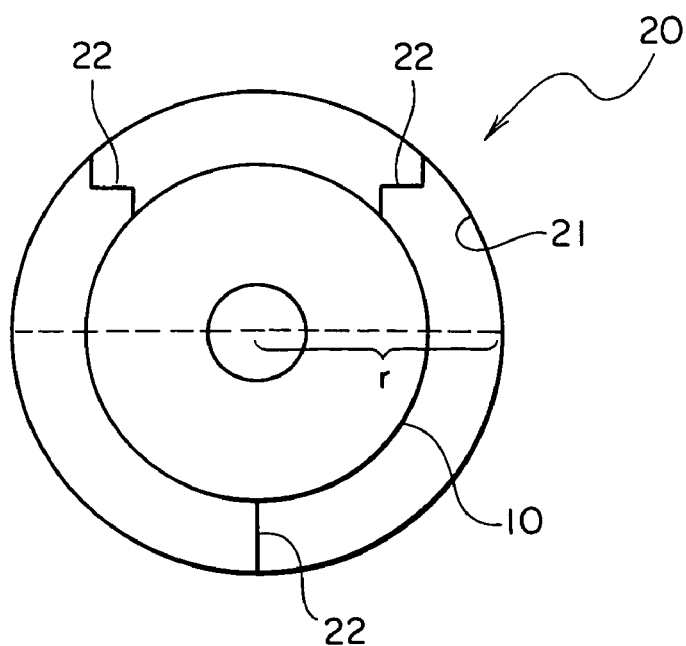
FIGS. 3A and 3B illustrate the schematic configuration of a plasma shielding member suitable for a protective layer film forming process according to the present invention.
Figure 3B:
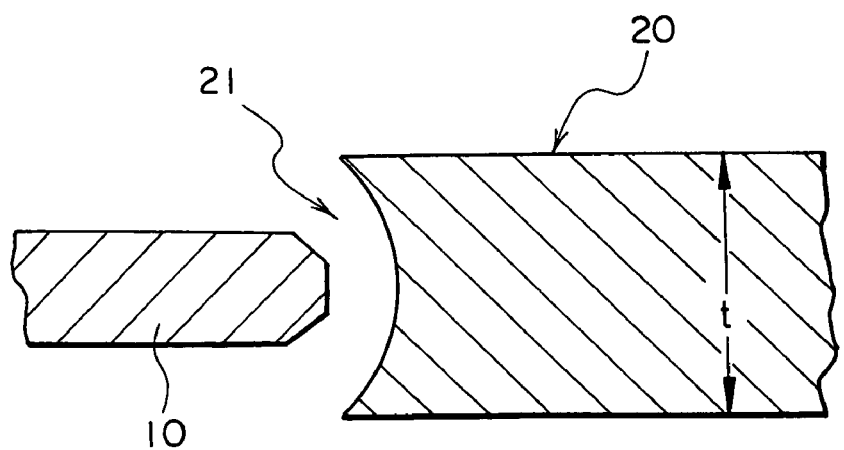

FIGS. 3A and 3B illustrate the schematic configuration of the plasma shielding member suitable for the protective layer forming process according to the present invention. FIG. 3A is a plane view, and FIG. 3B is a cross-sectional view.

A plasma shielding member 20 shown in FIGS. 3A and 3B comprises a circular opening portion (circular hole) 21, and holding pins 22 for holding a magnetic disk 10 (substrate with the magnetic layer) in a state disposed at the center of the opening portion 21. That is, the plasma-shielding member 20 also serves as a film-forming holder. The thickness (t) of the plasma-shielding member 20 is thicker than the substrate thickness of the magnetic disk 10, and also the radius (r) of the opening portion 21 is smaller than the diameter of the magnetic disk 10. In the event of forming the protective layer using the plasma shielding member 20 having such a configuration, upon enlarging the radius of the opening portion 21, the interval gap between the opening portion 21 and the magnetic disk enlarges, and more plasma gets into this gap, so that the film thickness of the protective layer at the side surface portion of the magnetic disk can be thickened. Also, upon the thickness of the plasma-shielding member 20 being gradually thickened as to the substrate thickness of the magnetic disk, plasma getting into between the opening portion 21 and the magnetic disk is gradually shielded, so that the film thickness of the protective layer at the side surface portion of the magnetic disk can be reduced. Note that as shown in FIG. 3B, even with the circumferential surface of the opening portion 21 of the plasma shielding member 20 being formed in a shape recessed to the inner side, more plasma enters into the gap between the opening portion 21 and the magnetic disk, so that the film thickness of the protective layer at the side surface portion of the magnetic disk can be thickened.

Thus, the film thickness of the protective layer at the side surface portion can be preferably controlled as to the film thickness of the protective layer on the principal surface of the magnetic disk by changing the opening diameter as to the outer diameter of the magnetic disk of the opening portion 21 of the plasma shielding member 20, and the thickness of the plasma shielding member 20 as to the substrate thickness of the magnetic disk. Note that description has been made regarding the film thickness of the protective layer formed at the side surface portion of the magnetic disk, but the film thickness of the protective layer formed at the above region serving as the load zone can be also controlled in the same way.

Such a carbonaceous protective layer is preferably formed using the plasma CVD method. With the carbonaceous protective layer formed with the plasma CVD method, elaborateness and hardness are high, which are preferable for the present invention. Note that when forming the protective layer, the protective layer is preferably formed on not only the principal surface of the substrate but also the side surface portion by forming the protective layer while applying a predetermined bias voltage to the substrate, and thus, the film thickness of the protective layer on the side surface as to the principal surface can be preferably adjusted.

At this time, a high-frequency power source is employed as a bias power source, for example, a high-frequency power of 10 through 400 W, preferably 100 through 300 W is preferably applied to the substrate. The frequency at the time of bias application is not particularly stipulated, but for example, a high-frequently power source of which the frequency is 10 through 30 MHz can be employed.

Note that the film formation of the protective layer is not restricted to the above plasma CVD method, for example, can be performed with the sputtering method while applying bias to the substrate.

In the present invention, the above magnetic layer is preferably a Co-alloy magnetic layer. A Co-alloy magnetic layer has a high coercive force, so is preferable for improvement of high recording density.

Specifically, the magnetic layer can be configured using CoPt alloy, CoCr alloy, CoCrPt alloy, CoCrPtTa alloy, CoCrPtB alloy, CoCrPtTaB alloy, CoCrNi alloy, or the like.

The magnetic disk according to the present invention can include a lubricant layer on the above protective layer. The material of the lubricant layer is not restricted to a particular material, but a material having adhesiveness for the carbonaceous protective layer is preferable, which may be liquid or solid. Specifically, as for a lubricant agent for forming the lubricant layer, a PFPE (perfluoro polyether) compound is preferable. As for such a PFPE (perfluoro polyether) compound, alcohol denatured PFPE can be preferably employed. Alcohol denatured PFPE has a chemical structure having hydroxyl (—OH) as a low-end functional group of PFPE principal chain, and adhesiveness for the carbonaceous protective layer is preferable.

In the present invention, the film thickness of the lubricant layer is not restricted to a particular thickness, but normally 5 through 20 Å (angstrom) or so is preferable.

With the present invention, as for the above disk-shaped substrate, a glass substrate is preferably employed. A glass substrate has high smoothness, so the requirement of reducing the flying amount of the magnetic head in connection with improvement of high recording density may be satisfied. Examples of the material of the glass substrate include glass ceramics such as aluminosilicate glass, soda lime glass, soda aluminosilicate glass, aluminoborosilicate glass, borosilicate glass, quartz glass, chain silicate glass, or crystallized glass, and so forth. Aluminosilicate glass excels in crashproof and vibration proof properties, so is particularly preferable.

In such aluminosilicate glass, a compression stress layer can be provided on the glass substrate surface by subjecting the glass to chemical strengthening, transverse strength, stiffness, crashproofing, vibration proofing, and heat resistance are excellent, Na is not separated out even under an hot environment, flatness is maintained, and also Knoop hardness is excellent. Also, the thickness of the glass substrate is preferably 0.1 through 1.5 mm or so.

With the present invention, in the event that the disk-shaped substrate is a disk-shaped substrate of which the side surface is subjected to mirror surface polishing, operations of the present invention are even better. The mirror surface quality of the side surface is preferably a mirror surface of 1 μm or less at the surface roughness Rmax, and 0.1 μm or less at the Ra. Also, the principal surface is preferably a disk-shaped substrate subjected to mirror surface polishing, and the mirror surface quality of the principal surface is preferably 6 nm or less at the Rmax, and 0.6 nm or less at the Ra. The principal surface is preferably smoother a mirror surface than the side surface. Note that the Rmax and the Ra are in conformity to Japanese Industrial Standards (JIS) B0601.

The magnetic disk according to the present invention can be obtained by forming at least the above magnetic layer and protective layer on the substrate. As for a specific embodiment, a magnetic disk is preferably configured so as to provide a seed layer, a base layer, an onset layer, a magnetic layer, a protective layer, and a lubricant layer on the substrate.

As for the seed layer, refinement of magnetic particles can be realized by employing an alloy having a bcc or B2 crystal structure, such as Al alloy, Cr alloy, NiAl alloy, NiAlB alloy, AlRu alloy, AlRuB alloy, AlCo alloy, FeAl alloy, or the like. In particular, AlRu alloy is preferable, and even more so an AlRu alloy comprising 30 to 70% of Al and the remainder of Ru as the amount of composition, which excels in refinement of magnetic particles.

As for the base layer, a layer for adjusting orientation of the magnetic layer can be provided, such as Cr alloy, CrMo alloy, CrV alloy, CrW alloy, CrTi alloy, Ti alloy, or the like. In particular, CrW alloy is preferable, of which alloy comprising 5 through 40% for W and the residual for Cr as the amount of composition, which excels in adjustment of the orientation of magnetic particles.

As for the onset layer, the epitaxial growth of the magnetic layer can be helped by employing a nonmagnetic material having the same crystal structure as the magnetic layer. For example, in the event that the magnetic layer comprises a Co alloy material, a material having nonmagnetic hcp crystal structure is employed, for example, CoCr alloy, CoCrPt alloy, CoCrPtTa alloy, or the like.

The details have been already described regarding the other layers, i.e., the magnetic layer, the protective layer, and the lubricant layer.

In the present invention, with regard to a method for forming each layer on the substrate, a known technique can be employed, for example, the sputtering method (DC magnetron sputtering, RF sputtering, etc.), the plasma CVD method, or the like can be employed.

Also, as for formation of the above lubricant layer, a known method can be employed, such as the dip method, spray method, spin coat method, or the like.

Description will be made more specifically regarding the embodiment according to the present invention by citing examples below. Note that the present invention is not restricted to the following examples.

Example 1

Figure 1:
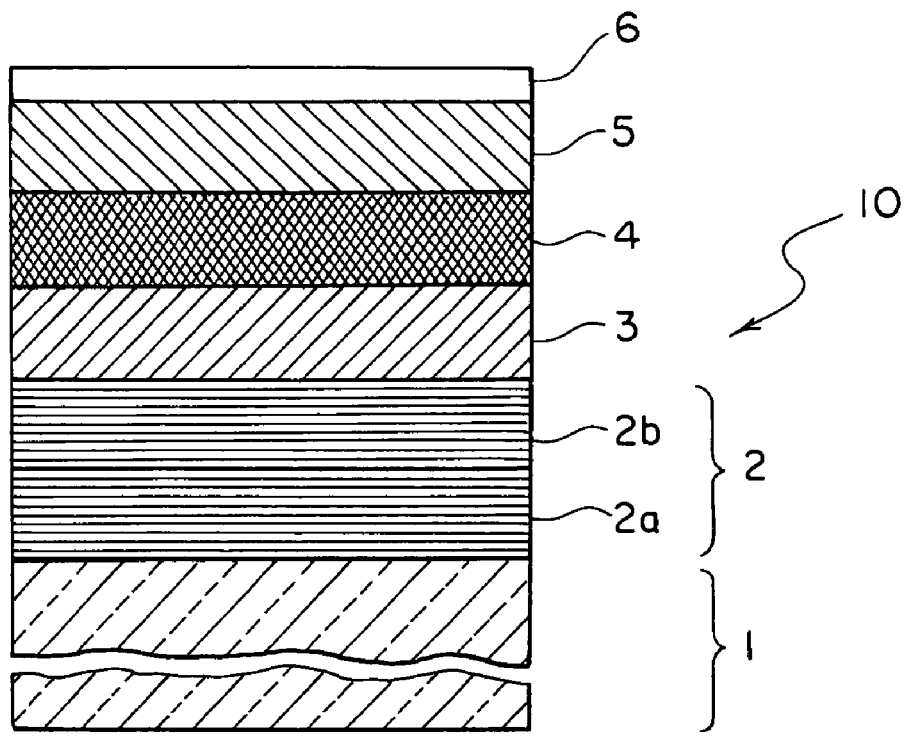
FIG. 1 is a cross-sectional view schematically illustrating the layer configuration of a magnetic disk according to an embodiment of the present invention.

As shown in FIG. 1, the magnetic disk 10 according to the present example is configured by layering a seed layer 2, a base layer 3, a magnetic layer 4, a protective layer 5, and a lubricant layer 6 in order on a glass substrate 1.

In the present example 1, first, a glass substrate made up of plate-shaped aluminosilicate glass with 66 mm diameter and 1.5 mm thickness was obtained from dissolved glass by direct press using an upper mold, lower mold, and chest mold, and the obtained glass was subjected to a rough lapping process (rough grinding process), shape forming process, precise lapping process (precise grinding process), end surface mirror surface forming process, and principal surface mirror surface polishing process in order, and subsequently subjected to chemical strengthening, thereby manufacturing the glass substrate 1 for a magnetic disk. With this glass substrate 1, the principal surface and the end surface were both subjected to mirror surface polishing.

A visual inspection and a close inspection were performed regarding the glass substrate surface subjected to the above chemical strengthening and the cleansing thereafter, and consequently, protrusions due to adhering substances, and defects such as scratches and so forth were not detected on the glass substrate surface. Also, upon measuring the surface roughness of the principal surface of the glass substrate obtained through the above processes using an atomic force microscope (AFM), the glass substrate for a magnetic disk having an extremely smooth surface as shown in Rmax=2.13 nm, and Ra=0.20 nm was obtained. Also, with the glass substrate, the outer diameter was 65 mm, the inner diameter was 20 mm, and the substrate thickness was 0.635 mm.

Next, the magnetic disk 10 was manufactured by forming the above respective layers on the obtained glass substrate 1 for a magnetic disk. First, the seed layer 2, the base layer 3, and the magnetic layer 4 were formed in order on the above glass substrate 1 using a sheet-type sputtering device.

With the seed layer 2, a first seed layer 2a made up of CrTi thin film (film thickness is 300 Å), and a second seed layer 2b made up of AlRu thin film (film thickness is 400 Å) were formed.

The base layer 3 was CrW thin film (film thickness is 100 Å), and was provided for obtaining the suitable crystal structure of the magnetic layer. This CrW thin film was configured with the composition ratio of 90% for Cr, and 10% for W.

The magnetic layer 4 was made up of CoPtCrB alloy, and the film thickness thereof was 200 Å.

With this magnetic layer, the respective contents of Co, Pt, Cr, and B are 73%, 7%, 18%, and 2% respectively. Upon the magnetic particle grain size being surveyed with plane shootings of a TEM (transmission electron microscope), the magnetic particle grain size was 7 nm on the average.

Next, the protective layer 5 was formed on the above magnetic layer 4 using the plasma CVD method. Specifically, the protective layer 5 was formed with the plasma CVD method wherein mixed gas in which acetylene gas and nitrogen were mixed at the rate of 97%: 3% was employed as material gas, and plasma was generated by applying a high-frequency electrical power (frequency of 27 MHz) to electrodes. At this time, a substrate temperature was set to 250° C., and the vacuum was set to around $5 \times 10^{-7}$ mb. The high-frequency bias of −300 W was applied to the substrate at the time of film formation. At this time, a combination of the opening portion (circular hole) radius of the holder (the above plasma shielding member in FIG. 3) for holding the substrate, and the thickness of the holder was changed as shown in the following Table 1.

TABLE 1

| | magnetic disk | | holder shape | | | |
|---|---|---|---|---|---|---|
| | outer diameter (mm) (A) | thickness (mm) (B) | radius of circular hole (mm) (C) | thickness (mm) (D) | C/A | D/B |
| Example 1-1 | 65.0 | 0.635 | 36.0 | 3.000 | 0.55 | 4.72 |
| Example 1-2 | 65.0 | 0.635 | 36.0 | 1.000 | 0.55 | 1.57 |
| Example 1-3 | 65.0 | 0.635 | 36.0 | 2.000 | 0.55 | 3.15 |
| Example 1-4 | 65.0 | 0.635 | 35.5 | 3.000 | 0.55 | 4.72 |
| Example 1-5 | 65.0 | 0.635 | 36.5 | 3.000 | 0.56 | 4.72 |
| Example 2 | 48.0 | 0.508 | 26.6 | 1.600 | 0.55 | 3.15 |
| Example 3 | 27.4 | 0.381 | 15.2 | 1.200 | 0.55 | 3.15 |
| Example 4 | 21.6 | 0.381 | 12.1 | 1.000 | 0.56 | 2.62 |
| Comparative Example 1 | 65.0 | 0.635 | — | — | — | — |
| Comparative Example 2 | 65.0 | 0.635 | 36.0 | 0.500 | 0.55 | 0.79 |
| Comparative Example 3 | 27.4 | 0.381 | 36.0 | 3.000 | 1.31 | 7.87 |

The film thickness of the formed protective layer, i.e., the film thickness of the protective layer of the chamfered surface and the side wall surface at the side surface portion, and the film thickness of the protective layer at the region serving as the data zone and the region serving as the load zone on the principal surface were measured by cross-sectional observation using the TEM (transmission electron microscope). The results are shown in the following Table 2.

TABLE 2

|  | film thickness of protective layer at side surface portion | | film thickness of protective layer on principal surface | |
| --- | --- | --- | --- | --- |
|  | chamfered surface (nm) | side wall surface (nm) | data zone (nm) | load zone (nm) |
| Example 1-1 | 2.64 | 1.06 | 4.00 | 4.40 |
| Example 1-2 | 2.72 | 1.09 | 4.00 | 4.53 |
| Example 1-3 | 2.65 | 1.06 | 4.00 | 4.42 |
| Example 1-4 | 2.53 | 1.01 | 4.00 | 4.22 |
| Example 1-5 | 2.63 | 1.05 | 4.00 | 4.38 |
| Example 2 | 2.65 | 1.06 | 4.00 | 4.42 |
| Example 3 | 2.59 | 1.04 | 4.00 | 4.32 |
| Example 4 | 2.57 | 1.03 | 4.00 | 4.28 |
| Comparative Example 1 | 8.23 | 8.10 | 4.00 | 6.31 |
| Comparative Example 2 | 4.74 | 4.27 | 4.00 | 4.67 |
| Comparative Example 3 | 8.19 | 8.06 | 4.00 | 6.15 |

Next, for the lubricant layer 6, a liquid lubricant agent of perfluoro polyether was formed using the DIP method, and heated and baked at 110° C. for 60 minutes, and the film thickness was set to 9 Å. As the above perfluoro (PFPE), alcohol denatured PFPE having hydroxyl (—OH) at both ends of PFPE principal chain was employed.

As described above, the magnetic disks according to the present examples (examples 1-1 through 1-5) were manufactured.

Examples 2 Through 4

Magnetic disks according to the present examples 2 through 4 were manufactured using glass substrates with outer diameters of 48.0 mm, 27.4 mm, and 21.6 mm respectively in the same way as with the example 1 except that the holders having shapes shown in Table 1 were employed at the time of forming the protective layers. Note that the film thicknesses of the protective layers are shown in the above Table 2.

Comparative Examples 1 Through 3

Magnetic disks according to the present comparative examples 1 through 3 were manufactured using glass substrates with outer diameters of 65.0 mm, and 27.4 mm respectively in the same way as with the example 1 except that the holders having shapes shown in Table 1 were employed at the time of forming the protective layers. Note that with the comparative example 1, the protective layer was formed without using the above holders. Also, the film thickness of the protective layer according to each comparative example is shown in the above Table 2.

A vibration test according to the following method was performed regarding the magnetic disks obtained with the respective examples and the respective comparative examples, the number of particles occurred at that time was counted, and the results were shown in the following Table 3.

[Vibration Test]

Each magnetic disk was put into a predetermined case, wrapped into a package, and transported by air using an international cargo flight, thereby applying vibration to each magnetic disk. After air transport, each package was unpacked, and the magnetic disk within each case was taken out. Each magnetic disk was dipped under deionized water, and the number of particles was counted using a submerged particle counter. Note that the number of particles was counted using deionized water where no magnetic disk was dipped, and the number of counts obtained by subtracting this from the above counts was shown in Table 3.

TABLE 3

|  | results of vibration test | |
| --- | --- | --- |
|  | number of particles | decision |
| Example 1-1 | 5 | acceptable |
| Example 1-2 | 8 | acceptable |
| Example 1-3 | 5 | acceptable |
| Example 1-4 | 1 | acceptable |
| Example 1-5 | 4 | acceptable |
| Example 2 | 5 | acceptable |
| Example 3 | 3 | acceptable |
| Example 4 | 2 | acceptable |
| Comparative Example 1 | 197 | rejected |
| Comparative Example 2 | 33 | rejected |
| Comparative Example 3 | 195 | rejected |

While all of the magnetic disks according to the examples exhibited extremely low occurrence of particles, all of the magnetic disks according to the comparative examples exhibited extremely high occurrence of particles. Upon analyzing the components of particles, the present inventor found that the same components as with the material of the protective layer are included. With all of the magnetic disks according to the comparative examples, the film thickness of the protective layer at the side surface portion was thicker than the film thickness of the protective layer at the data zone on the principal surface, thereby considering that occurrence of particles was accelerated.

Also, a durable reliability test was performed regarding each of the obtained magnetic disks based on the following LUL durability test.

(LUL Durability Test)

The above each magnetic disk, and a magnetic head comprising an NPAB (negative pressure type) slider and a magneto-resistance effect-type reproduction device (GMR device) were mounted on a magnetic recording device, the flying amount of the magnetic head was set to 10 nm, and load/unload operations (LUL actions) of the head were repeatedly performed.

As a result, all of the magnetic disks according to the examples withstood the LUL actions one million times without any failure. On the other hand, all of the magnetic disks according to the comparative examples malfunctioned at LUL actions of 300,000 times due to head crashing. When each of the magnetic disks according to the comparative examples was removed from the magnetic recording device, and the surface thereof was inspected using a scanning electron microscope, adhesion of protruding foreign objects was observed. When analyzing this foreign object, the present inventor found that the same components as with the material of the protective layer are included. The present inventor assumes that the particle occurring adhered to the magnetic disk surface as a protruding foreign object, and this caused the failure under the low flying amount of 10 nm.

What is claimed is:

1. A magnetic disk for use in a load-unload method, comprising a magnetic layer and a protective layer sequentially formed on a disk-shaped substrate, said magnetic disk having a principal surface and a side surface portion both of which are coated with said protective layer, said side surface portion including a side wall surface and a chamfered surface lying between the side wall surface and said principal surface, wherein said side wall surface and said chamfered surface have said protective layer formed thereon, and wherein said magnetic disk further comprises:

a region serving as a data zone for recording data; and a region serving as a load zone lying between the data zone and the side surface portion for loading a magnetic head on the magnetic disk;

a protective layer formed on said side surface portion is a film thinner than a protective layer formed on said region serving as a data zone;

a protective layer formed on said region serving as a load zone is a film thicker than a protective layer formed on said region serving as a data zone.

2. The magnetic disk according to claim 1, wherein said protective layer is an amorphous carbonaceous protective layer.

3. The magnetic disk according to claim 1, wherein a film thickness of the protective layer on said principal surface is 4 nm or more and 8 nm or less, and a film thickness of the protective layer on said side surface portion is 0.5 nm or more and less than 4 nm.

4. The magnetic disk according to claim 1, wherein a protective layer formed on said chamfered surface is a film thicker than a protective layer formed on said side wall surface.

* * * * *